Patented Feb. 3, 1942

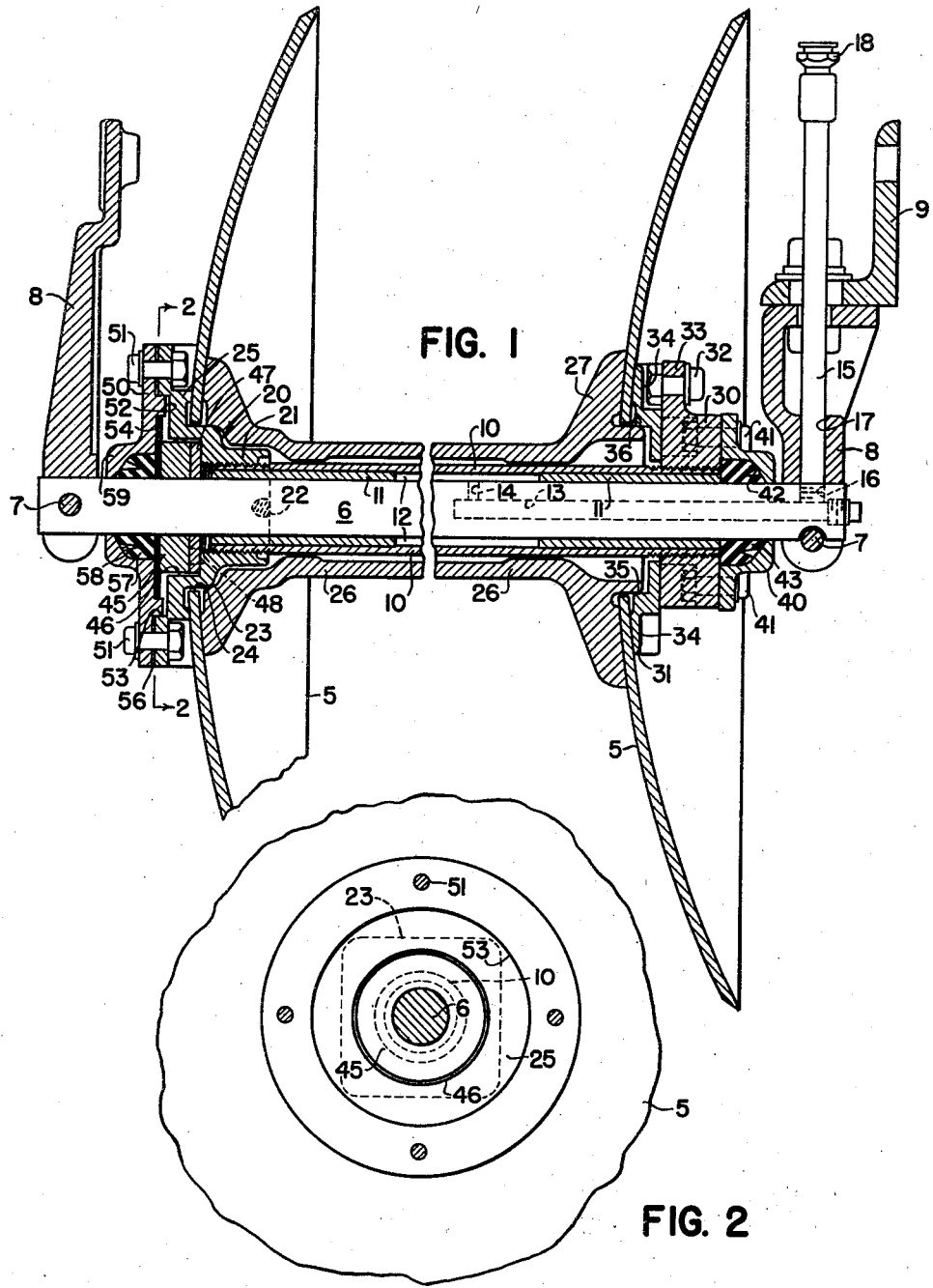

2,272,100

UNITED STATES PATENT OFFICE 2,272,100

DISK GANG ASSEMBLY

Thomas M. Thomas, Huntington Park, Edwin F. Wadelton, Los Angeles, and Oscar W. Sjogren, Huntington Park, Calif., assignors to Killefer Manufacturing Corporation, Los Angeles, Calif., a corporation of California Application February 5, 1941, Serial No. 377,466

7 Claims. (Cl. 97—220)

The present invention relates generally to disk gang assemblies and more particularly to the means for mounting disk blades in the frame of a disk harrow or other implement, so that the disks are supported on a tubular shaft journaled on a fixed shaft or axle secured to the frame structure.

The principal object of this invention relates to the provision of an improved form of mounting for ground working disks on a fixed axle or shaft secured to the implement frame, whereby the disks are supported on a rotatable tube journaled on the axle, the ends being sealed to provide a lubricant-containing, dust-proof housing which is of simple construction and permits exceptionally free rotation of the ground working disks.

A related object of this invention has to do with the further provision of a simplified thrust bearing, which not only resists the thrust of the disk blades during operation but also prevents axial movement of the disk blades in the opposite direction and prevents the latter from rubbing on the gang frame, and is extremely simple and inexpensive to build without sacrifice of strength or durability.

These and other objects and advantages of our invention will be apparent after a consideration of the following description, in which reference is had to the drawing appended hereto, in which Figure 1 is a sectional elevation taken along the center line of a disk harrow gang, embodying the principles of our invention and showing the bearing construction at each end of the gang assembly, the central portion being broken away for purposes of simplification; and Figure 2 is a sectional end view taken along a line 2—2 in Figure 1.

Referring now to the drawing, the disk gang assembly comprises a plurality of ground working disks 5 of the conventional concavo convex type, rigidly assembled together in a unitary structure and rotatably journaled on a relatively stationary axle 6 which is rigidly secured by suitable bolts 7 to a pair of supporting standards 8 disposed at opposite ends of the axle 6. The standards 8 are rigidly interconnected by a gang frame, represented by the frame member 9 but not shown in detail inasmuch as any suitable frame can be used and the details thereof are not important in the present disclosure. The axle 6 is enclosed, except at its ends, in a tube 10, the opposite ends of which are journaled on the axle 6 by means of suitable bearing sleeves 11, pressed tightly into the ends of the tube 10. The sleeves 11 are preferably of bronze or other suitable bearing material. The tube 10 is constructed with an internal diameter appreciably larger than the outside diameter of the axle 6 and thus providing a space 12 therebetween, which not only serves to accommodate the bearing sleeves 11 but provides a lubricant retaining reservoir between the two bearing sleeves 11, into which space lubricant is supplied through a bore 13, axially disposed at one end of the axle 6 and communicating with the reservoir 12 by means of a passage 14. A lubricant supply pipe 15 is threaded at one end into a passage 16 communicating with the axial bore 13 and extends radially outwardly through a drilled hole 17 in one of the standards 8 and is provided at its outer end with a lubricant fitting 18, through which lubricant can be forced to fill the reservoir 12.

Fixed at one end of the tube 10 is a bracket 20 including a sleeve portion 21 which is preferably threaded on the end of the tube 10 and then spot welded to the latter, as indicated at 22, to prevent the bracket 20 from rotating relative to the tube. The bracket 20 is provided with an enlarged portion 23 of square cross section, which is adapted to receive the square aperture 24 in the end disk 5, and is further provided with a flange portion 25, which forms an abutment for the convex side of the end disk 5. The latter is held against the flange 25 by means of a spacing spool 26, which encircles the tube 10 and is provided at its opposite end with a flange 27 forming the abutment for the next disk 5. The spool 26 is broken away at the center to indicate that any number of disks with their respective spacing spools can be interposed between the two end disks, as well-known to those skilled in the art. The assembly of disks and spools is rigidly clamped against the bracket flange 25 by means of a gang nut 30, which is threaded on the opposite end of the tube 10 and bears against a gang washer 31, which abuts the concave side of the disk 5 at that end of the assembly. After the nut 30 has been tightened against the disk assembly, it is held from unscrewing by means of a bolt 32 which is inserted through a suitable aperture in a flange 33 extending radially outwardly from the nut 30, and the inner end of the bolt 32 projects into one of a number of recesses 34 formed in the washer 31. The latter is provided with an internal recess 35 of square cross section adapted to receive a cooperative square end flange 36 on the spool 26 and thus the entire assembly is interlocked to prevent any portion thereof from rotation relative to the remainder of the assembly.

A sealing cap 40 is bolted to the end of the nut 30 by bolts 41 and embraces the axle 6 at the end of the tube 10. A recess 42 is provided within the cap 40 for holding an annular resilient sealing member 43 which bears upon the axle 6 and prevents leakage of lubricant from the end of the tube bearing sleeves 11.

At the opposite end of the axle 6 a thrust collar 45 is shrunk or otherwise fixed to the axle 6 and is disposed to fit within a circular recess 46 in the end of the bracket 20. A wear plate 47 is disposed in bearing contact with the collar 45 and is connected to the inner face of the recess 46 in the bracket 20 by suitable pins or keys 48, which prevents relative rotation between the bracket 20 and the rub plate 47. Thus the end thrust of the gang disks 5 is transmitted through the bumper bracket 20 and the wear plate 47 to the face of the thrust collar 45, which, being rigidly fixed to the axle 6, resists the thrust force and prevents axial movement of the disk assembly toward the left, as viewed in Figure 1.

The disk assembly is prevented from moving axially along the axle 6 to the right, and is thus prevented from rubbing against the supporting standard 8 at the right hand end, by means of a second bracket or cover member 50, which is rigidly attached by bolts 51 to the outer portion of the flange 25 on the bumper bracket 20. The cover bracket 50 is provided with an annular ridge 52, which fits into a recess 53 in the flange portion 25, to center the cover 50 relative to the axle 6. The inner face of the cover member 50 bears against the side of the thrust collar 45 opposite the wear plate 47 and a number of shims 54 are inserted between the cover 50 and the thrust collar 45 to adjust the amount of end play between the disk gang assembly and the axle 6.

The thrust bearing is lubricated by lubricant from the housing reservoir 12, which passes between the bearing sleeve 11 and the axle 6 and flows into the space around the thrust collar 45. The lubricant is prevented from leaking out between the two brackets 20 and 50 by means of an annular gasket 56 disposed between the outer edges of the brackets 20, 50 and around the bolts 51. The lubricant is prevented from leaking out of the end of the housing around the axle 6 by means of an annular resilient sealing member 57 disposed within a recess 58 in a hub portion 59, formed integral with the cover bracket 50.

We do not intend our invention to be limited to the exact details shown and described herein, except as specified in the claims which follow.

We claim:

1. A disk gang comprising in combination, a gang frame, an axle, bracket means at each end of said axle for rigidly supporting the latter on said frame, a tube enclosing said axle and journaled thereon, a plurality of ground working disks fixed on said tube, a thrust collar rigidly fixed to said axle, means on said tube bearing on one side of said collar to transmit the thrust force of said disks against the latter, and means fixed to said tube and bearing against the opposite side of said collar to resist axial movement of said tube in the opposite direction.

2. A disk gang comprising in combination, a gang frame, an axle, bracket means at each end of said axle for rigidly supporting the latter on said frame, a tube enclosing said axle and journaled thereon, a plurality of ground working disks fixed on said tube, a thrust collar rigidly fixed to said axle adjacent one end thereof, means adjacent the end of said tube bearing on the inner face of said collar to transmit the thrust force of said disks against the latter, and a bracket detachably fixed to said tube and bearing against the opposite face of said collar to resist axial movement of said tube in the opposite direction.

3. A disk gang comprising in combination, a gang frame, an axle, bracket means at each end of said axle for rigidly supporting the latter on said frame, a tube enclosing said axle and journaled thereon, a plurality of ground working disks fixed on said tube, a thrust collar rigidly fixed to said axle adjacent one end thereof, a pair of brackets detachably fixed together embracing the two faces of said collar and rotatable relative thereto, and means for rigidly fixing said brackets to the end of said tube.

4. A disk gang comprising, in combination, a gang frame, an axle rigidly fixed thereto, a tube enclosing said axle and journaled thereon, a thrust collar rigidly fixed to said axle, a first bracket fixed on the end of said tube and adapted to bear against said collar to transmit thrust force thereagainst, a plurality of disks and spacing spools mounted on said tube and disposed in abutment with said bracket, means engaging the opposite end of said tube for rigidly clamping said disks and spools against said bracket, and a second bracket detachably fixed to said first bracket and embracing said axle on the opposite side of said collar from said tube, said second bracket being adapted to bear against said collar to restrain said tube from axial movement away from said collar.

5. A disk gang comprising, in combination, a gang frame, an axle rigidly fixed thereto, a tube enclosing said axle and journaled thereon, a thrust collar rigidly fixed to said axle, a first bracket fixed on the end of said tube and adapted to bear against said collar to transmit thrust force thereagainst, a plurality of disks and spacing spools mounted on said tube and disposed in abutment with said bracket, means engaging the opposite end of said tube for rigidly clamping said disks and spools against said bracket, a second bracket detachably fixed to said first bracket and embracing said axle on the opposite side of said collar from said tube, said second bracket being adapted to bear against said collar to restrain said tube from axial movement away from said collar, means for introducing lubricant between said axle and said tube, resilient sealing means disposed between said second bracket and said axle, and sealing means between the opposite end of said tube and said axle.

6. A disk gang comprising, in combination, a gang frame, an axle rigidly fixed thereto, a tube enclosing said axle and journaled thereon, a thrust collar rigidly fixed to said axle, a first bracket fixed on the end of said tube and adapted to bear against said collar to transmit thrust force thereagainst, said bracket having a hub portion adapted to receive a disk mounted thereon and a flange portion extending radially outwardly on the convex side of said disk, serving to take the axial thrust thereof and transmitting the same to said collar, a plurality of disks and spacing spools mounted on said tube, a gang nut threaded on the opposite end of said tube for clamping said disks and spools against said flange portion of said bracket, and a second bracket detachably fixed to said first bracket and embracing said axle on the opposite side of said collar from said tube, said second bracket being adapted to bear against said collar to restrain said tube from axial movement away from said collar.

7. A disk gang comprising, in combination, a gang frame, an axle rigidly fixed thereto, a tube enclosing said axle and journaled thereon, a first thrust collar rigidly fixed to said axle, a first bracket fixed on the end of said tube and adapted to bear against said collar to transmit thrust force thereagainst, said bracket having a hub portion adapted to receive a disk mounted thereon and a flange portion extending radially outwardly on the convex side of said disk, serving to take the axial thrust thereof and transmitting the same to said collar, a plurality of disks and spacing spools mounted on said tube, a gang nut threaded on the opposite end of said tube for clamping said disks and spools against said flange portion of said bracket, a second bracket detachably fixed to said first bracket and embracing said axle on the opposite side of said collar from said tube, said second bracket being adapted to bear against said collar to restrain said tube from axial movement away from said collar, means for introducing lubricant between said axle and said tube, resilient sealing means disposed between said second bracket and said axle, and sealing means between the opposite end of said tube and said axle.

THOMAS M. THOMAS.
EDWIN F. WADELTON.
OSCAR W. SJOGREN.